US006940251B1

(12) United States Patent
Sarlioglu et al.

(10) Patent No.: US 6,940,251 B1
(45) Date of Patent: Sep. 6, 2005

(54) DECOUPLING OF CROSS COUPLING FOR FLOATING REFERENCE FRAME CONTROLLERS FOR SENSORLESS CONTROL OF SYNCHRONOUS MACHINES

(75) Inventors: Bulent Sarlioglu, Torrance, CA (US); Colin E. Huggett, Longmont, CO (US)

(73) Assignee: Honeywell International Inc., Morristown, NJ (US)

( * ) Notice: Subject to any disclaimer, the term of this patent is extended or adjusted under 35 U.S.C. 154(b) by 12 days.

(21) Appl. No.: 10/834,857

(22) Filed: Apr. 30, 2004

(51) Int. Cl.$^7$ ............................................. H02P 3/18
(52) U.S. Cl. ..................... 318/721; 318/700; 318/254; 318/609; 318/610
(58) Field of Search .............................. 318/609, 700, 318/721, 432, 434, 254, 799

(56) References Cited

U.S. PATENT DOCUMENTS

| | | | |
|---|---|---|---|
| 3,629,689 A | 12/1971 | Riff | 322/28 |
| 3,887,852 A | 6/1975 | Fernandes et al. | 318/197 |
| 4,453,116 A * | 6/1984 | Bose | 318/727 |
| 4,616,166 A | 10/1986 | Cooper et al. | 318/712 |
| 4,876,634 A | 10/1989 | Paice | 363/5 |
| 4,935,686 A | 6/1990 | Stacey | 318/801 |
| 5,029,263 A | 7/1991 | Rozman | 318/714 |
| 5,036,267 A | 7/1991 | Markunas et al. | 322/10 |
| 5,066,866 A | 11/1991 | Hallidy | 290/1 |
| 5,124,904 A | 6/1992 | Paice | 363/3 |
| 5,189,357 A | 2/1993 | Woodson et al. | 318/737 |
| 5,245,238 A | 9/1993 | Lynch et al. | 310/116 |
| 5,254,936 A | 10/1993 | Leaf et al. | 322/90 |
| 5,404,091 A | 4/1995 | Radun | 322/94 |
| 5,428,275 A | 6/1995 | Carr et al. | 318/146 |
| 5,428,283 A | 6/1995 | Kalman et al. | 318/729 |
| 5,430,362 A | 7/1995 | Carr et al. | 318/779 |
| 5,455,759 A | 10/1995 | Paice | 363/126 |
| 5,493,195 A | 2/1996 | Heglund et al. | 318/701 |
| 5,493,201 A | 2/1996 | Baker | 322/10 |
| 5,495,127 A | 2/1996 | Aota et al. | 290/31 |
| 5,512,811 A | 4/1996 | Latos et al. | 322/10 |
| 5,568,034 A * | 10/1996 | Huggett et al. | 318/802 |
| 5,594,322 A | 1/1997 | Rozman et al. | 322/10 |
| 5,619,407 A | 4/1997 | Hammond | 363/155 |
| 5,652,485 A * | 7/1997 | Spiegel et al. | 318/147 |

(Continued)

FOREIGN PATENT DOCUMENTS

| | | | | |
|---|---|---|---|---|
| EP | 1 115 196 | | 7/2001 | H02P 7/05 |
| WO | 02/097961 | | 12/2002 | H02P 6/18 |

*Primary Examiner*—Rina Duda
(74) *Attorney, Agent, or Firm*—Oral Caglar, Esq.

(57) ABSTRACT

A synchronous motor controller and method of controlling a synchronous motor without using rotor position sensors are provided. In a floating synchronous reference frame controller, phase currents are measured and a current Park vector is determined. The error between an initially arbitrary floating reference frame is reduced with a control loop. Decoupling terms based on the estimated speed of the rotor and the stator winding inductance are used to generate decoupled voltage terms in the v- and u-axis of the floating synchronous reference frame. The decoupled voltage command is converted back to a stator reference frame and applied to the synchronous motor via a power electronic converter. As a result u-axis current is minimized during transients, and a robust and accurate estimation of the current vector to be used in coordinate transformation for controlling the machine are achieved and the need for overrating of motor and inverter components is avoided.

12 Claims, 5 Drawing Sheets

U.S. PATENT DOCUMENTS

| | | | | |
|---|---|---|---|---|
| 5,656,911 | A | 8/1997 | Nakayama et al. | 318/718 |
| 5,689,165 | A | 11/1997 | Jones et al. | 318/701 |
| 5,703,421 | A | 12/1997 | Durkin | 310/61 |
| 5,780,997 | A | 7/1998 | Sutrina et al. | 322/29 |
| 5,818,192 | A | 10/1998 | Nozari | 318/609 |
| 5,844,385 | A | 12/1998 | Jones et al. | 318/254 |
| 5,850,133 | A | 12/1998 | Heglund | 318/700 |
| 5,867,004 | A | 2/1999 | Drager et al. | 318/701 |
| 5,877,606 | A | 3/1999 | Nozari | 318/700 |
| 5,903,066 | A | 5/1999 | Enjeti et al. | 307/105 |
| 5,920,162 | A | 7/1999 | Hanson et al. | 318/254 |
| 5,949,204 | A | 9/1999 | Huggett et al. | 318/254 |
| 6,008,618 | A * | 12/1999 | Bose et al. | 318/811 |
| 6,011,377 | A | 1/2000 | Heglund et al. | 318/701 |
| 6,035,626 | A | 3/2000 | Wahl et al. | 60/39.02 |
| 6,069,467 | A | 5/2000 | Jansen | 318/802 |
| 6,069,808 | A | 5/2000 | Panahi et al. | 363/98 |
| 6,087,750 | A | 7/2000 | Raad | 310/152 |
| 6,101,113 | A | 8/2000 | Paice | 363/126 |
| 6,150,778 | A | 11/2000 | Morris | 318/254 |
| 6,201,715 | B1 | 3/2001 | Huggett et al. | 363/48 |
| 6,288,515 | B1 | 9/2001 | Hiti et al. | 318/722 |
| 6,301,136 | B1 | 10/2001 | Huggett et al. | 363/95 |
| 6,316,920 | B1 | 11/2001 | Huggett et al. | 323/207 |
| 6,329,798 | B1 | 12/2001 | Huggett et al. | 323/207 |
| 6,359,412 | B1 | 3/2002 | Heglund | 318/701 |
| 6,362,590 | B2 | 3/2002 | Nozari | 318/609 |
| 6,407,531 | B1 * | 6/2002 | Walters et al. | 318/805 |
| 6,414,866 | B2 | 7/2002 | Huggett et al. | 363/124 |
| 6,438,321 | B1 | 8/2002 | Lin | 388/800 |
| 6,467,725 | B1 | 10/2002 | Coles et al. | 244/58 |
| 6,498,736 | B1 | 12/2002 | Kamath | 363/44 |
| 6,525,951 | B1 | 2/2003 | Paice | 363/154 |
| 6,583,995 | B2 | 6/2003 | Kalman et al. | 363/35 |
| 6,640,196 | B1 | 10/2003 | Unsworth et al. | 702/115 |
| 2002/0110007 | A1 | 8/2002 | Kalman et al. | 363/35 |
| 2003/0020429 | A1 | 1/2003 | Masaki et al. | 318/727 |

* cited by examiner

DECOUPLING OF CROSS COUPLING FOR FLOATING REFERENCE FRAME CONTROLLERS FOR SENSORLESS CONTROL OF SYNCHRONOUS MACHINES

REFERENCE TO RELATED APPLICATIONS

Related subject matter is disclosed in U.S. Pat. No. 6,301,136, issued on Oct. 9, 2001, entitled "Floating Frame Controller", the entire contents of which is incorporated herein by reference.

FIELD OF THE INVENTION

The invention relates to a method and apparatus for performing electrical power conversion, and more particularly, to a position sensorless method and apparatus for controlling a power converter such as an inverter.

BACKGROUND OF THE INVENTION

A conventional synchronous motor typically uses rotor position sensors to provide information regarding the position of the motor's rotor with respect to the motor's stator windings. Rotor position sensors such as Hall effect devices are typically mounted in the stator, proximate the stator windings. The rotor position sensors provide rotor position information, which allows for proper control for the conversion of power that is supplied to the stator windings of an electrical machine.

However, rotor position sensors can be unreliable due to mechanical alignment problems (e.g., problems caused by bearings) and temperature incompatibility problems between the stator windings and electronic components such as the Hall effect devices. Moreover, the rotor position sensors can be difficult to mount to the motor during motor assembly, especially for multi-pole motors. In multi-pole motors, the electrical misalignment angle is equivalent to the angular mechanical misalignment angle multiplied by the number of pairs of poles.

In response to the problems with rotor sensors, position sensorless control techniques have been developed for controlling the speed of the synchronous machines.

U.S. Pat. No. 6,301,136 to Huggett et al., which is incorporated herein in its entirety, discloses a floating synchronous reference frame controller, which advantageously provides a floating synchronous reference frame for controlling an inverter to drive a synchronous motor. However, due to the coupling impact of the motor circuitry in floating synchronous reference frame (as will be described later) delays exist during transients during which the estimated angle of the current Park vector differs from the actual angle of the current Park vector. Also, the coupling impact of the motor equivalent circuit in floating synchronous reference frame forces the gain of the regulator used for angle estimation to be kept small which slows down the system response. A further result of using a small gain is a significant delay in reducing the error between the estimated angle of the current Park vector and the actual angle of the current Park vector during slow transients, such as acceleration and deceleration, as well as fast transients, such as step changes. Because undesirable imaginary axis current flows in the machine during these delays, longer delays may require substantial overrating of the inverter and electrical machine.

Ideally, only real-axis current flows in the machine, as the floating synchronous reference frame is by definition aligned with the real axis component of the current Park vector.

Thus, there is a need for faster, more robust, more accurate sensorless estimation of the angle of the current Park vector that minimizes imaginary axis component of the current Park vector, and avoids the need for overrating of inverters and PM machines.

SUMMARY OF THE INVENTION

The above disadvantages are avoided and other advantages are realized in embodiments of the present invention. According to one aspect of the invention, a synchronous motor controller includes a direct-axis current decoupler adapted to generate a decoupled direct-axis signal based on a quadrature-axis signal and an estimated rotor speed. The controller also includes a quadrature-axis current decoupler adapted to generate a decoupled quadrature-axis signal based on a direct-axis signal and said estimated rotor speed. The decoupled signals can further be based on the inductance of the stator winding.

According to another aspect of the invention, a method of controlling a synchronous motor is provided. The method includes the steps of measuring at least two phase currents and determining a current Park vector based on said two phase currents. The method also includes the steps of estimating a position of a current Park vector, estimating an angular velocity of said current Park vector (which is approximately equal to rotor speed for two pole machines); and generating a decoupled voltage command based on a floating synchronous reference frame current Park vector and said estimated angular velocity.

According to yet another aspect of the present invention, a method of starting a synchronous motor is provided. The method includes the steps of delivering an initial voltage command to said motor; determining whether an initial torque is negative, and reversing a polarity of said voltage command is said initial torque is negative. The method can also include the steps of measuring at least two phase currents, determining a current Park vector based on said phase currents, estimating a position of a current Park vector of said motor, estimating an angular velocity of said current Park vector (which is approximately equal to rotor), and generating a decoupled voltage command based on a floating synchronous reference frame current Park vector and said estimated angular velocity.

BRIEF DESCRIPTION OF THE DRAWINGS

The invention will be more readily understood with reference to the embodiments illustrated in the attached drawing figures, in which.

DETAILED DESCRIPTION OF THE PREFERRED EMBODIMENTS

The preferred embodiments of the invention will now be described with reference to the attached drawing figures. A system and method for estimating the angular position of a current Park vector and hence controlling the electrical machine without the need for position sensors is described in U.S. Pat. No. 6,301,136, the contents of which is incorporated herein by reference in its entirety.

Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

Figure 1:
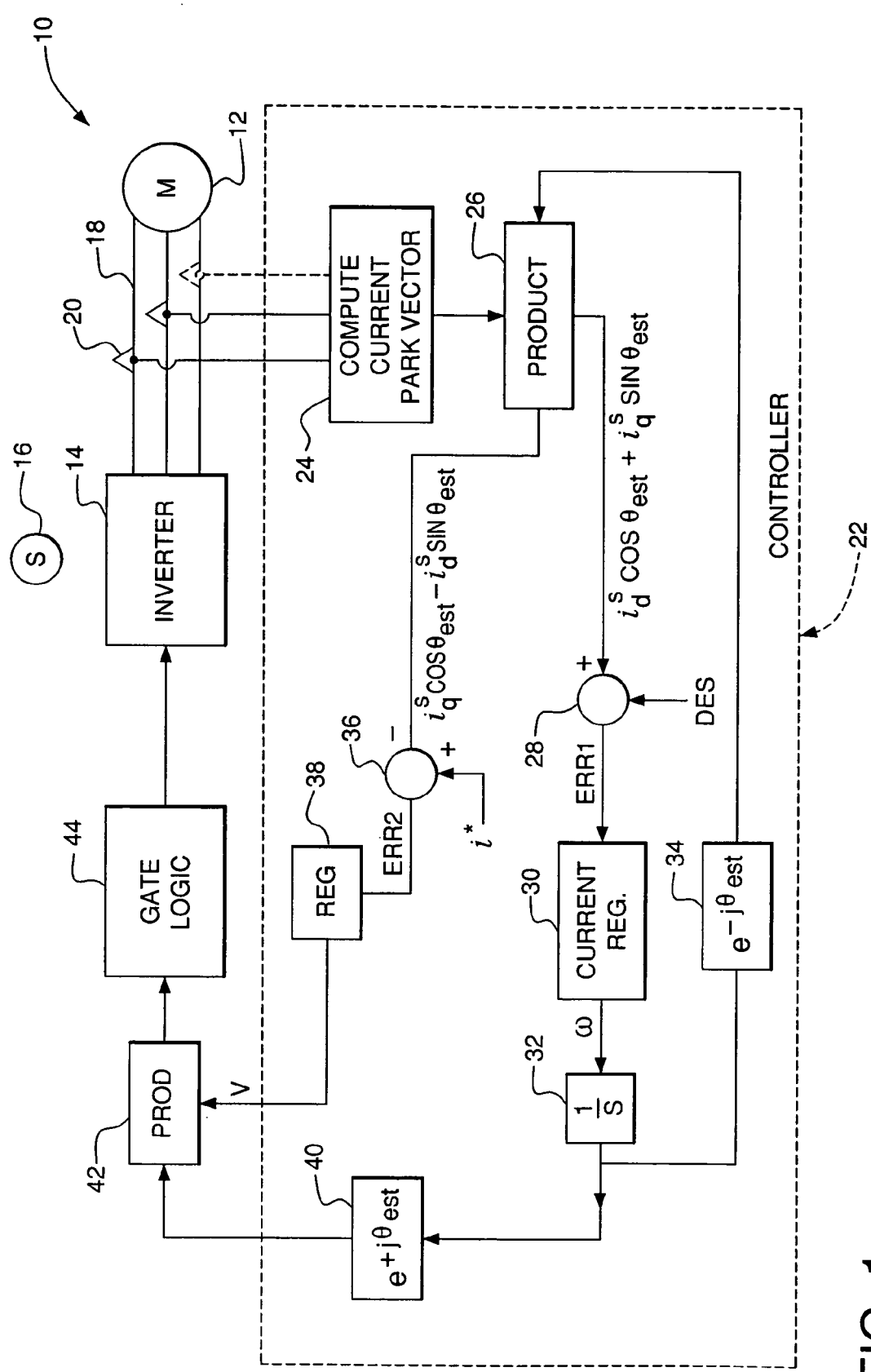
FIG. 1 is a block diagram of a floating synchronous reference frame controller.

FIG. 1 illustrates a synchronous machine drive system 10 including a three-phase synchronous machine 12, an inverter 14 and a power source 16 for supplying dc power to the inverter 14. During operation of the synchronous machine 12, the inverter 14 converts the dc power to three-phase ac power and supplies (via a power line 18) currents to all three stator windings of the machine 12. These currents flow through the windings and create a rotating magnetic field.

Because of the spatial relationship of the stator windings and the temporal relationship of the phase currents, the Park vector representing the phase currents may be represented by a two-dimensional complex number (provided that the neutral of the stator windings is not galvanically tied to any point in the inverter 14). Similarly, voltages and rotor flux can be represented by their own voltage and flux Park vectors.

The rotating magnetic field interacts with main field flux provided by the machine's rotor, resulting in a torque. The torque is constant if the main field flux Park vector and the current Park vector are maintained at a constant angle relative to one another and the amplitude of the current Park vector is constant. Maximum torque occurs at a ninety degree angle and minimum torque occurs at a zero degree angle.

If a rotor reference frame (that is a reference frame that coincides with the magnetic axis of the rotor) is known, the current Park vector can be converted from a stationary reference frame to a synchronous reference frame with respect to the rotor, and the inverter 14 can be controlled by Q-D current regulation in the synchronous reference frame. The objective is finding the reference frame without the use of rotor position sensors.

The system 10 estimates the reference frame without using position sensors. The system 10 further includes a set of current sensors 20 for sensing current on the power line 18 and a floating synchronous reference frame controller 22 for controlling the inverter 14 to convert the dc power to suitable three-phase ac power. Each current sensor 20 is synchronously and periodically sampled. Thus, a set of at least two current samples are produced periodically.

Each time a set of current samples ($i_a$, $i_b$, $i_c$) is produced, the controller 22 computes a current Park vector from the current samples (block 24). The current Park vector ($i^s$) can be decomposed into a direct-axis component ($i_d$) and a quadrature-axis component ($i_q$) in the stationary reference frame. Thus, $i^s_{qd} = i^s_q - ji^s_d$.

Figure 2:
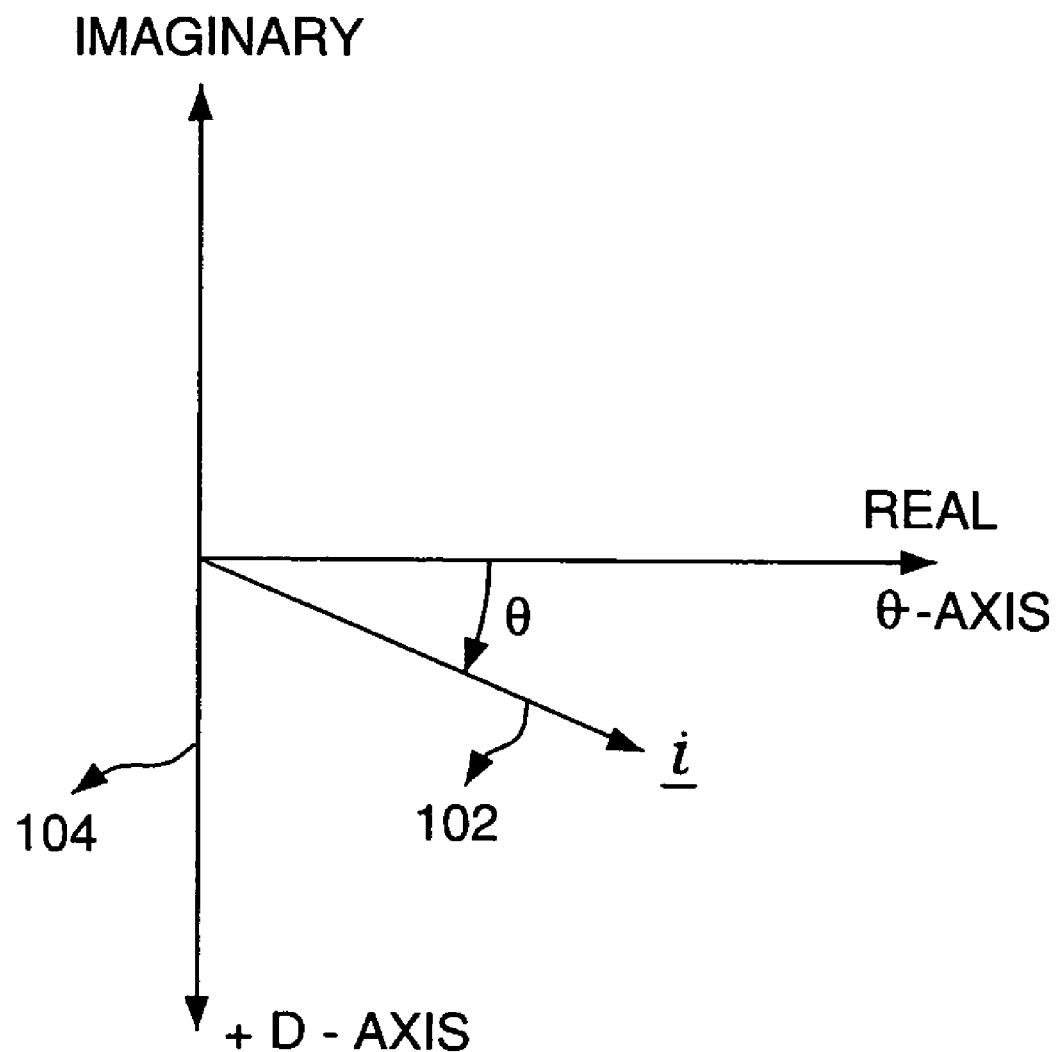
FIG. 2 illustrates Park vector representing a reference frame and a line current.

After the line current is sampled, the controller 22 selects a reference frame for the current Park vector. The reference frame may be represented by a unit amplitude Park vector as a complex number in polar coordinates in the form of ($e^{+j\theta_{est}}$) or in Cartesian coordinates in the form of ($\cos \theta_{est} + j \sin \theta_{est}$). Initially, the reference frame is arbitrary. Afterwards, however, the reference frame will be adjusted to be synchronous with the rotor, but not congruent with magnetic axis of the rotor. A Park vector 104 representing the reference frame and a Park vector 102 representing the line current are illustrated in FIG. 2.

The controller 22 performs a multiplication (block 26) of the reference frame ($e^{-j\theta_{est}}$ or $\cos \theta_{est} - j \sin \theta_{est}$) and the current Park vector ($i^s_{qd} = i^s_q - ji^s_d$). The result of the multiplication, a current Park vector in a synchronous frame, may be expressed as:

$$i_{vu} = i_v - ji_u = i^s_{qd} e^{-j\theta_{est}} = (i^s_q \cos \theta_{est} - i^s_d \sin \theta_{est}) - j(i^s_d \cos \theta_{est} + i^s_q \sin \theta_{est})$$

Where $$i_v = (i^s_q \cos \theta_{est} - i^s_d \sin \theta_{est})$$

$$i_u = (i^s_d \cos \theta_{est} + i^s_q \sin \theta_{est})$$

The controller 22 rotates the reference frame so that the u-axis component $i_u = (i^s_d \cos \theta_{est} + i^s_q \sin \theta_{est})$ equals a predetermined value. The predetermined value is typically zero or some other predetermined value.

The reference frame may be rotated as follows. The controller 22 generates an error signal (block 28) from a predetermined value (DES) and the u-axis component ($i^s_d \cos \theta_{est} + i^s_q \sin \theta_{est}$) and operates upon the error signal (ERR1) in a proportional-integral ("PI") controller or current regulator (block 30) to obtain an estimated angular rate ($\omega$) of the rotor. The controller 22 integrates the estimated angular rate ($\omega$) (block 32) to obtain an estimated angle ($\theta_{est}$). The estimated angle ($\theta_{est}$) is used to generate the reference frame in the form of $e^{+j\theta_{est}}$ (block 40), and the complex conjugate of the reference frame $e^{-j\theta_{est}}$ (block 34).

When the u-axis component is equal to the predetermined value (DES), a synchronous floating reference frame is established. Once the angle of the current Park vector is known, the controller 22 uses the magnitude of the v-axis component ($i^s_q \cos \theta_{est} - i^s_d \sin \theta_{est}$) to control the amplitude of the voltage applied to the inverter 14. The controller 22 generates a second error signal (ERR2) from the real portion ($i_q \cos \theta_{est} - i_d \sin \theta_{est}$) of the v-axis component and a current command ($i^*$) (block 36). The current command ($i^*$) may be derived from a higher level control loop (e.g., power transfer, speed of a machine), which is usually application specific.

The second error signal (ERR2) is regulated by a v-axis current regulator (block 38) to produce a voltage command (V). The unit vector $e^{j\theta_{est}}$ of the unit amplitude Park vector is taken (block 40) and multiplied by the voltage command (V) (block 42). This multiplication converts the voltage command (V) from the synchronous floating frame (v-u coordinates) to the stationary frame (qs-ds) coordinates.

The vector (G) resulting from this product is supplied to gate logic 44. The gate logic 44 uses this vector (G) to turn on and off power switches of the inverter 14 in a sequence that causes the inverter to selectively energize the stator windings and create a motor torque. The frequency of the switching is usually fixed at 20 kHz, the gating sequence is calculated at this frequency and is well understood by those skilled in the art. The modulation could be a pulse width modulation (PWM) topology such as space vector PWM or sine PWM.

During normal operation of the synchronous machine 12, speed can be changed by changing the value of the current command Park vector (i*). Thus, the synchronous machine may be operated at variable speeds.

Because of the transformation between the stationary reference frame and the floating synchronous reference frame (v-u coordinate system), cross coupling is introduced between the u- and v-axes. The cross-coupling of the two equivalent circuits can be understood by transforming the equivalent circuit of one of the synchronous machines from the stationary reference frame to a floating synchronous reference frame (v-u) according to transformation equations. Referencing FIG. 5, this cross coupling is represented by blocks 526–529 in 510.

Figure 4:
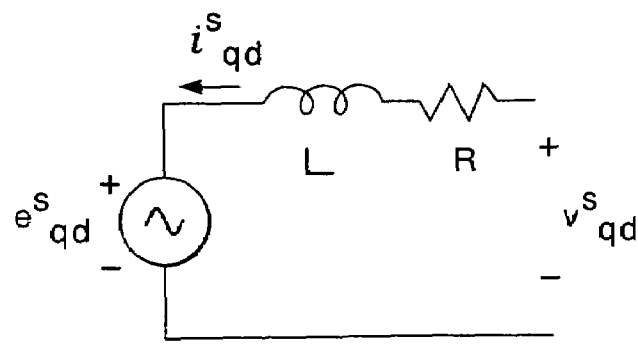
FIG. 4 illustrates an equivalent circuit for a synchronous motor according to an embodiment of the present invention.

For purposes of illustration, it is assumed that a surface mounted PM synchronous machine is represented by phase resistance, synchronous inductance, and back emf in the stationary reference frame, as shown in FIG. 4. Thus, $$\underline{v}^s_{qd} = \underline{e}^s_{qd} + L\, d\underline{i}^s_{qd}/dt + \underline{i}^s_{qd} R$$

where $\underline{v}^s_{qd}$ is the Park vector of inverter voltage, $\underline{e}^s_{qd}$ is the Park vector of back emf, $\underline{i}^s_{qd}$ is the Park vector of phase current, all in stationary reference frame. L is the synchronous inductance, and R is the phase resistance of the synchronous machine.

Figure 3:
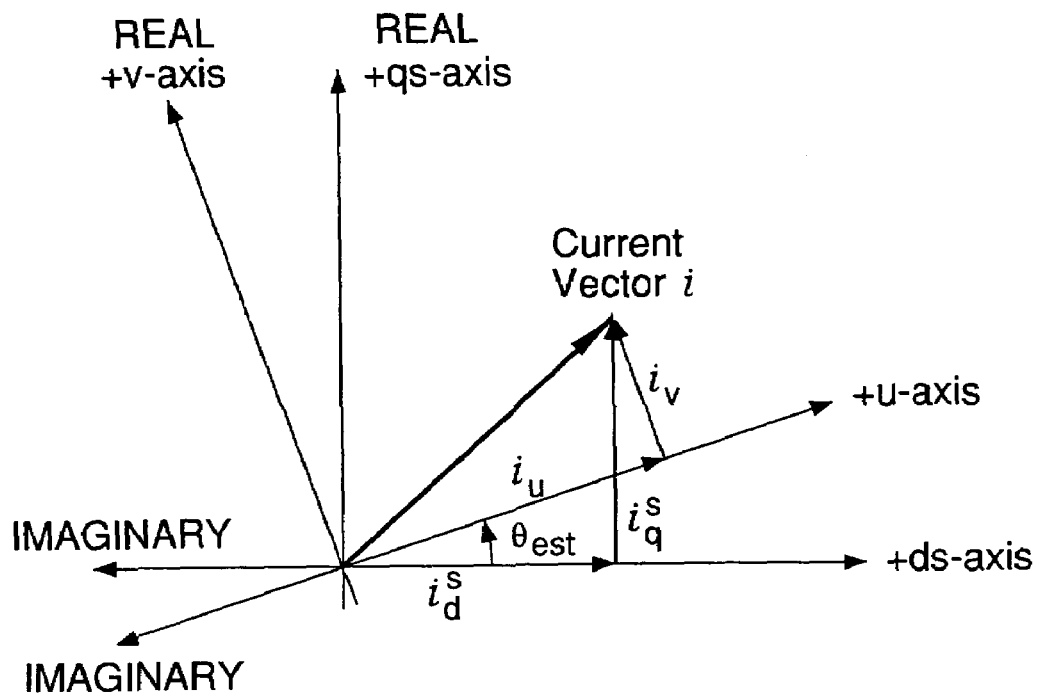
FIG. 3 illustrates a relationship between a stationary reference frame axis and a floating synchronous reference frame axis, and components of a vector current in both reference frames.

FIG. 3 shows a vector diagram illustrating the relationship between the stationary and floating synchronous reference frames. The qs-ds axis represents the stationary reference frame. The phase currents are represented by a current Park vector that is composed of direct and quadrature components. The current Park vector in stationary reference frame is preferably constructed using the measured phase currents $i_a$, $i_b$ and $i_c$ and is represented as:

$$\underline{i}^s_{qd} = 2/3(i_a + a i_b + a^2 i_c) = i^s_q - j i^s_d$$

$$i^s_q = 2/3(i_a - 0.5(i_b + i_c))$$

$$i^s_d = -2/3 * 0.866(i_b - i_c)$$

where:

$$a = e^{j2\pi/3} \text{ and } a^2 = e^{-j2\pi/3}$$

The v-u axis of FIG. 3 represents the floating synchronous reference frame that is aligned with the estimated angle of the phase current Park vector. Based on the relationship between the two sets of axis, the following transformation equations are derived:

$$\underline{i}_{vu} = i_v - j i_u \text{ (Current Vector in Floating Synchronous Reference Frame)}$$

Current Transformation Equations $$\underline{i}^s_{qd} = \underline{i}_{vu} e^{j\theta_{est}} \text{ or } \underline{i}_{vu} = \underline{i}^s_{qd} e^{-j\theta_{est}}$$

$$i_v = -i^s_d \sin\theta_{est} + i^s_q \cos\theta_{est}$$

$$i_u = i^s_d \cos\theta_{est} + i^s_q \sin\theta_{est}$$

$$i^s_q = i_u \sin\theta_{est} + i_v \cos\theta_{est}$$

$$i^s_d = i_u \cos\theta_{est} - i_v \sin\theta_{est}$$

Voltage Transformation Equations $$\underline{v}^s_{qd} = \underline{v}_{vu} e^{j\theta_{est}} \text{ or } \underline{v}_{vu} = \underline{v}^s_{qd} e^{-j\theta_{est}}$$

$$v_v = -v^s_d \sin\theta_{est} + v^s_q \cos\theta_{est}$$

$$v_u = v^s_d \cos\theta_{est} + v^s_q \sin\theta_{est}$$

$$v^s_q = v_u \sin\theta_{est} + v_v \cos\theta_{est}$$

$$v^s_d = v_u \cos\theta_{est} - v_v \sin\theta_{est}$$

As will be appreciated by those skilled in the art, cross coupling between the u and v axes causes interference in the control loops comprised of regulator 38 and regulator 30 (reference FIG. 1). Embodiments of the present invention significantly improve the estimation of the rotor position by introducing decoupling terms in the floating synchronous reference frame controller 22. This ensures that when there is a transient in either the u- or v-axis component of the current Park vector, the cross coupling between the current regulation loop and the position estimation loop is cancelled out. As a consequence, the gain of the current regulation loops can be increased significantly. Because higher gain in the current regulation loops is permitted, more accurate tracking of the angle of the current Park vector in stationary reference frame is enabled, which significantly reduces the u-axis current component during transients. Consequently, the decoupling feature permits more robust, reliable and efficient sensorless control. Furthermore, because u-axis current is minimized, inverters and synchronous machines employing embodiments of the present invention can be rated for lower currents, thereby advantageously decreasing their necessary size and cost.

The cross-coupling terms in the floating synchronous reference frame are:

$$-j(d\theta_{est}/dt)L i_u \text{ and } +j(d\theta_{est}/dt)L i_v$$

or $$-j\omega_{est} L i_u \text{ and } +j\omega_{est} L i_v$$

According to an embodiment of the present invention, the cross-coupling is decoupled by commanding $+j(d\theta_{est}/dt)L i_u$ and $-j(d\theta_{est}/dt)L i_v$ voltage terms in the respective loops of the floating synchronous reference frame controller.

Figure 5:
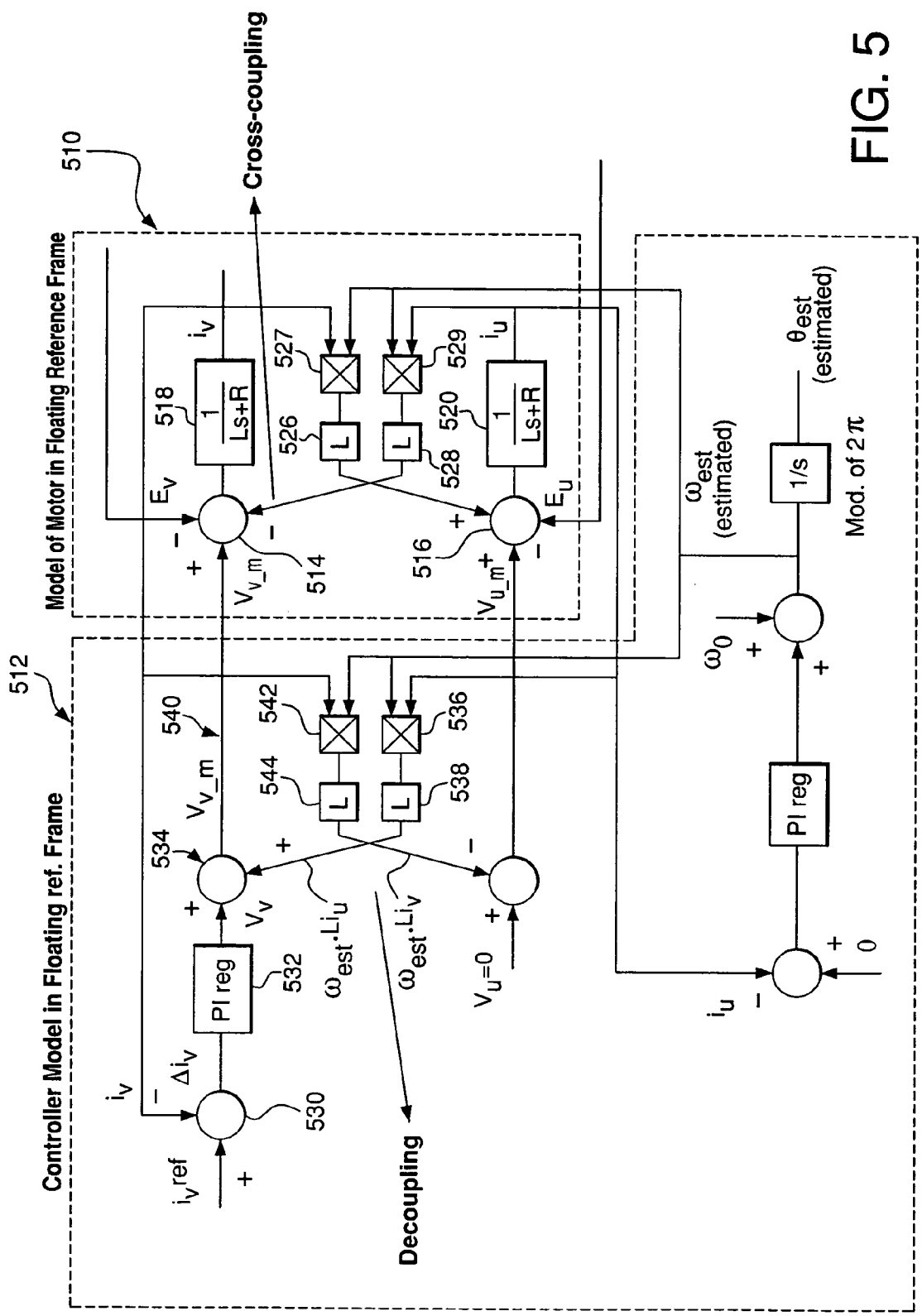
FIG. 5 illustrates a model for a floating synchronous frame controller and a motor according to an embodiment of the present invention.

FIG. 5 is a block diagram illustrating a controller model and machine model according to an embodiment of the present invention. Controller 512 controls and regulates two voltage command loops to generate v- and u-axis voltage commands. Machine model 510 which is represented in floating synchronous reference frame receives the voltage commands. Machine model 510 illustrates the cross-coupling of the v- and u-axis current loops in floating synchronous reference frame. Adders 514 and 516 receive respective v- and u-axis voltage command signals from controller 512, where they are combined with respective back emf component signals (Ev and Eu) and cross-coupling signals. The output of adders 514 and 516 is received by stator windings in the machine, as indicated by (1/(Ls+R)) blocks 518 and 520 to generate stator winding currents $i_v$ and $i_u$. As shown, multiplication blocks 527 and 529 and inductance blocks 526 and 528 generate respective cross-coupling feedback loops within machine model 510 that feedback to adders 514 and 516. Multiplication block 527 receives input from current iv and the estimated angular rate of the rotor ($\omega_{est}$), and the resultant signal is fed back to the u-axis loop at adder 516. Similarly, multiplication block 529 receives input from current $i_u$ and the estimated angular speed of the rotor ($\omega_{est}$), and the resultant signal is fed back to the v-axis loop at adder 514. The output of adders 514 and 516 are operated upon by blocks 518 and 520 and currents $i_v$ and $i_u$ are generated in the stator windings of the machine.

The decoupling feature of floating synchronous frame controller 512 will now be described. The v-axis current command $i_v^{ref}$ is received at comparator 530, and compared to the actual v-axis current $i_v$ to generate a current error signal $\Delta i_v$, all in floating synchronous reference frame. $\Delta i_v$ is operated upon by PI regulator 532 to generate voltage command signal $V_{v\_m}$. The v-axis voltage command is decoupled at adder 534 which adds the output of multiplication block 536 and inductance block 538 to voltage command signal $V_v$ to generate decoupled voltage command signal $V_{v\_m}$ 540. Multiplication block 536 multiplies current $i_u$ with estimated rotor angular speed signal $\omega_{est}$. The output of multiplication block 536 is received by inductance block 538 to generate the decoupling command term $j(d\theta_{est}/dt)Li_u$.

Similarly for the u-axis, which attempts to command zero current, multiplication block 542 multiplies the v-axis current iv with estimated rotor angular speed signal $\omega_{est}$. The output of multiplication block 542 is received by inductance block 544 which generates decoupling command term $-j(d\theta_{est}/dt)Li_v$.

Figure 6:
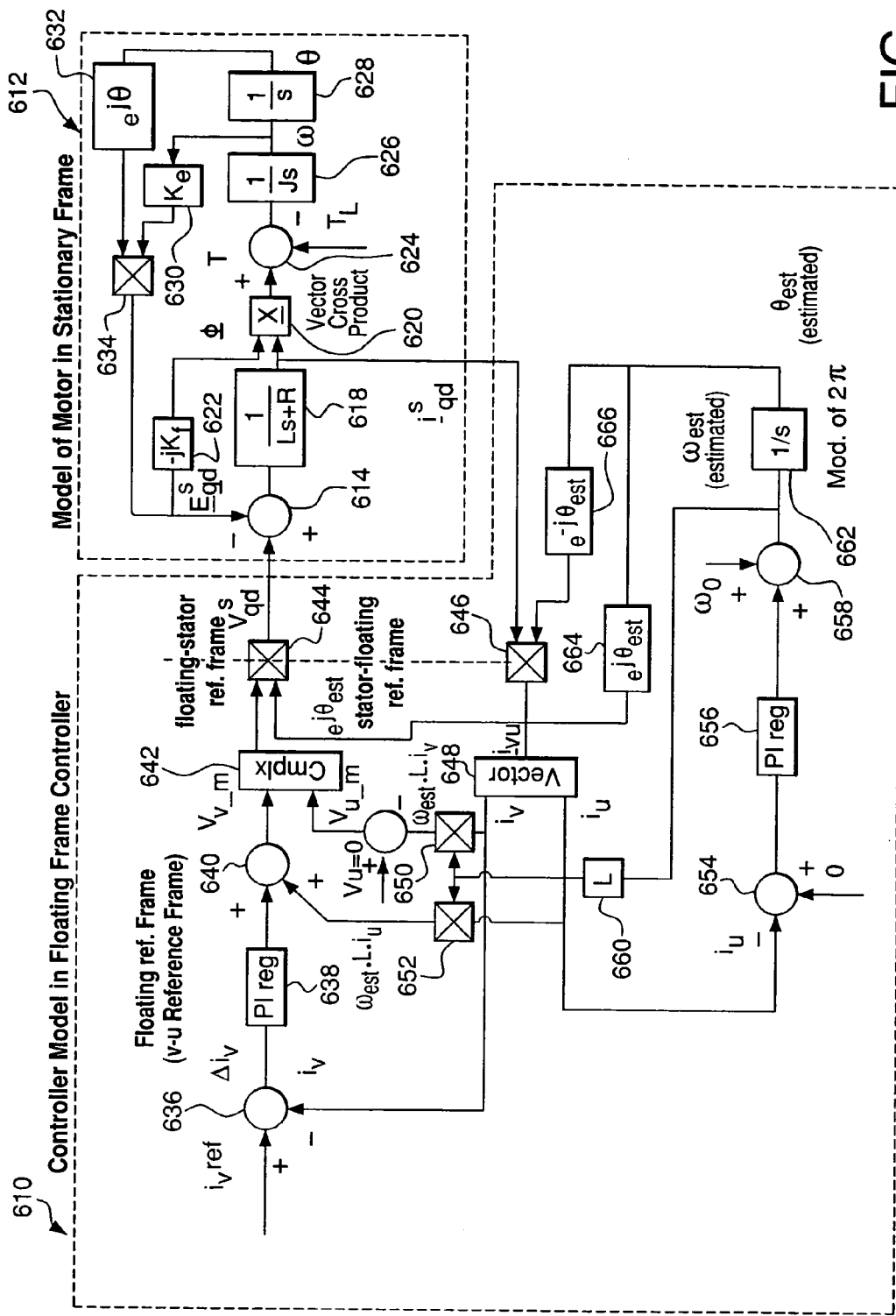
FIG. 6 illustrates a model for a floating synchronous frame controller and a motor in vector format according to an embodiment of the present invention.

FIG. 6 is a block diagram illustrating a controller model and machine model according to an embodiment of the present invention in Park vector format. Controller 610 controls and regulates a the machine current Park vector by generating a voltage Park vector $\underline{V}^s_{qd}$. Machine model 612 receives and utilizes the voltage command. Adder 614 receives the voltage Park and compares it to a back-emf ( $\underline{E}^s_{qd}$) Park vector of the machine. The resultant signal drives a current Park vector through the stator windings according to [1/(Ls+R)] block 618. The output of block 618 is received by vector product block 620. Block 620 also receives a signal generated by the back-emf vector multiplied by ($-jK_f$) in block 622. The output of vector product block 620 is electrical torque produced by the machine T, and is subtracted from the load torque $T_L$ at adder 624. The output of adder 624 is received by [1/Js] block 626 which outputs angular velocity signal $\omega$ (J is inertia). Angular velocity signal $\omega$ is received by integral [1/s] block 628 and $K_e$ block 630. The output of integral [1/s] block 628 is an angular position signal $\theta$. The angular position signal $\theta$ is received by block 632, which multiplies the angular position signal by $e^{j\theta}$. The outputs of block 632 and block 630 are received by multiplication block 634, which generates back emf Park vector $\underline{E}^s_{qd}$.

Floating synchronous Frame Controller 610 will now be described in greater detail. In floating synchronous reference frame current reference $i_v^{ref}$ is received by adder 636 and compared to measured v-axis current $i_v$. Current error signal $\Delta i_v$ is output from adder 636 to PI Regulator 638. PI regulator 638 generates a non-decoupled v-axis voltage term, which is received by adder 640. Adder 640 also receives a decoupling term $\omega_{est}Li_v$ from multiplier block 652, and generates decoupled v-axis voltage term $V_{v\_m}$. The decoupled v-axis and u-axis voltage terms are received by Complex block 642 to generate a floating synchronous reference frame voltage Park vector command. The floating reference frame voltage Park vector command is multiplied by $e^{j\theta_{est}}$ at multiplication block 644 to generate the stator reference frame voltage command $\underline{V}^s_{qd}$ imposed to the motor.

Similarly, adder 650 receives the u axis reference current, which is preferably zero, and a decoupling term $\omega_{est}Li_u$ from multiplier block 650. Decoupled u axis voltage term $V_{v\_m}$ is provided to Complex block 642 from adder 650.

Now the feedback and decoupling portion of floating synchronous frame controller 610 will be described. Stator reference frame current Park vector is constructed using at least two machine phase currents and received by multiplication block 646, where it is converted to the floating synchronous reference frame by multiplying the stator current vector by $e^{-j\theta_{est}}$ where $\theta_{est}$ is the estimated angular position of the rotor. The output of multiplication block 646 is floating synchronous reference frame vector current $i_{vu}$. Floating synchronous reference frame vector current $i_{vu}$ is received by Vector block 648, which generates v-axis and u-axis components of vector current $i_{vu}$. v-axis current $i_v$ is received by decoupling term multiplication block 650, and also by adder 636. U-axis current $i_u$ is received by decoupling term multiplication block 652, and also by adder 654. U-axis current signal $i_u$ is compared to zero at adder 654, and the output of adder 654 is received by PI regulator 656. The output of PI regulator 656 is added to an initial angular velocity $\omega_0$ at adder 658 to generate an estimated angular velocity signal $\omega_{est}$. Estimated angular velocity signal $\omega_{est}$ is amplified by L at block 660 to produce term $L\omega_{est}$ (or $L[d\theta_{est}/dt]$) which is input to multiplication blocks 650 and 652 to generate the decoupling terms. Velocity estimate $\omega_{est}$ is also received by integration [1/s] block 662 to generate position estimate $\theta_{est}$. $\theta_{est}$ is received by block 664 to generate $e^{j\theta_{est}}$, which is input to multiplication block 644 to convert from the floating synchronous reference frame to the stationary reference frame. $\theta_{est}$ is also received by block 666 to generate term $e^{-j\theta_{est}}$, used to convert from the stator frame to the floating synchronous reference frame.

Depending upon the initial position of the rotor, there may be zero-torque positions at zero speed. This means that there would be no finite angle between the flux Park vector and the applied current Park vector. The starting of the motor in this case can be difficult, and even more so due to the additional static friction of the bearings. There is also a potential situation in that based on the initial position of the rotor, the rotor may rotate backwards due to the negative torque applied by the initial current command. If this situation is not corrected by the control system the rotation cannot recover a positive direction.

The following method according to an embodiment of the invention provides the ability to correct an initial application of torque in a negative direction. Because embodiments of the present invention preferably do not require position sensors, the initial position of the rotor is not known. Therefore, there is a need for a scheme to achieve a positive rotation regardless of the initial rotor position. This means that rotor can rotate slightly in negative direction first, but the system recovers from the negative rotation to a positive rotation.

A low frequency (for example 10 rad/s) is injected to the summing junction via $\omega_0$ (FIG. 5 and FIG. 6) to achieve initial rotation. Both torque and rotation recover positive direction even if initial torque and rotation is in negative direction by setting the lower limit of the PI regulator to "zero". The output of the PI regulator prevents the speed estimation from becoming a negative value which always guarantees positive rotation even after a short reverse rotation.

This low frequency injection can be taken out after a certain positive rotational speed is achieved or, alternatively, it can be left permanently because the dynamics of the PI regulator compensates for this error.

While the invention herein disclosed has been described by means of specific embodiments and applications thereof, numerous modifications and variations can be made thereto by those skilled in the art without departing from the scope of the invention as set forth in the claims.

What is claimed is:

1. A synchronous motor controller comprising:
   a direct current decoupler adapted to generate a decoupled direct signal based on a quadrature signal and an estimated rotor speed; and
   a quadrature current decoupler adapted to generate a decoupled quadrature signal based on a direct signal and said estimated rotor speed.

2. A synchronous motor controller as in claim 1, wherein said decoupled direct signal is further based on a winding inductance.

3. A synchronous motor controller as in claim 1, wherein said decoupled quadrature signal is further based on a winding inductance.

4. A method of controlling a synchronous motor comprising the steps of:
   measuring at least two phase currents;
   determining a stationary reference frame current Park vector based on said phase currents;
   transforming the stationary reference frame current Park vector to a floating reference frame current Park vector;
   estimating an angular velocity of the stationary reference frame current Park vector using the floating reference frame current Park vector;
   estimating an angle of the stationary reference frame current Park vector; and
   generating a decoupled voltage command based on the floating reference frame current Park vector and said estimated angular velocity.

5. The method of claim 4, wherein said decoupled voltage command is further based on an inductance of at least one stator winding in said motor.

6. A method of starting a synchronous motor comprising the steps of:
   delivering an initial voltage command to said motor;
   measuring at least two phase currents in said motor;
   constructing a stationary reference frame current Park vector based on said phase currents;
   transforming said stationary reference frame current Park vector into a floating reference frame current Park vector;
   comparing a u-axis component of said floating reference frame current Park vector to a predetermined value;
   using a PI regulator to drive u-axis current towards said predetermined value;
   if an output of said PI regulator is negative, forcing said output to be zero;
   adding an initial low frequency to said output of said PI regulator;
   estimating the velocity and angle of the stationary reference frame current Park vector based on the output of the PI regulator; and
   modifying the voltage command based on the output of the PI regulator.

7. The method of starting a synchronous motor as in claim 6, wherein said predetermined value is zero.

8. The method of starting a synchronous motor as in claim 6, further comprising the step of delivering a final voltage command to said motor.

9. The method of claim 8, wherein said voltage command is further based on an inductance of at least one stator winding in said motor.

10. The method of claim 6, further comprising the step of removing the initial low frequency when the output of the PI regulator reaches a threshold.

11. The method of claim 10, wherein said threshold is greater than said initial low frequency.

12. A method of controlling a synchronous motor comprising the steps of:
    calculating direct and quadrature voltage components for a floating reference frame based on at least two phase currents,
    decoupling said direct and quadrature voltage components based on an estimated rotor speed; and
    generating a voltage command based on said decoupled direct and quadrature components.

* * * * *